April 25, 1933.  S. L. LEMEL  1,905,415
DEVICE FOR THE PROTECTION OF THE EYES
Filed March 26, 1931
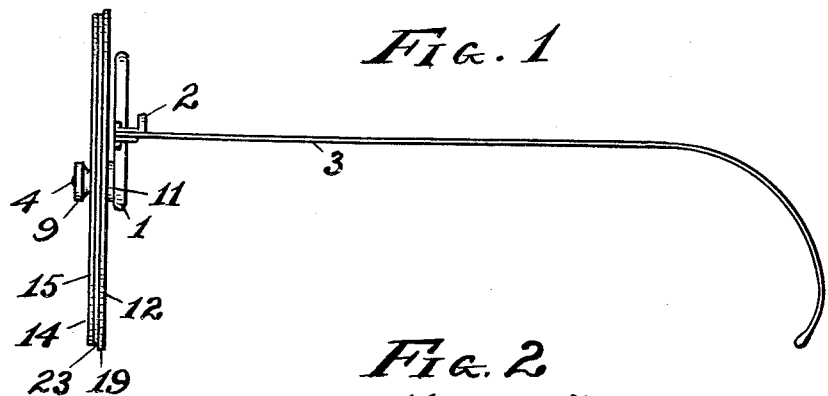
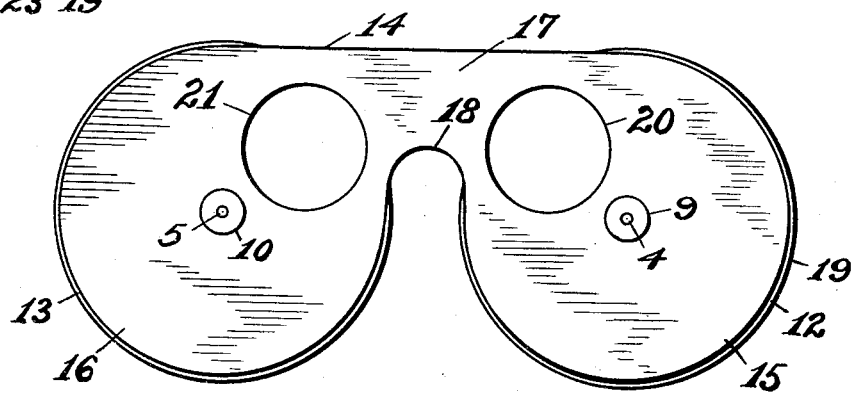
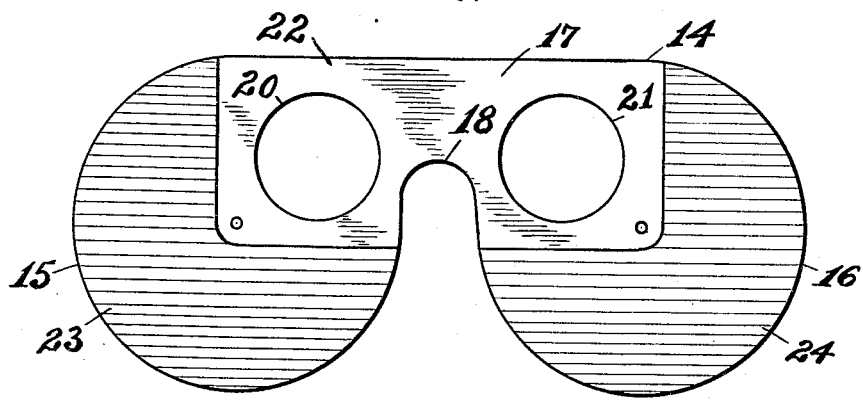
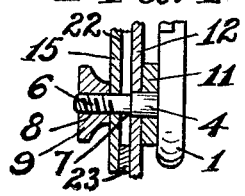
Inventor
Samuel L. Lemel
By G. E. Dunstan,
his Attorney Patented Apr. 25, 1933

1,905,415

UNITED STATES PATENT OFFICE

SAMUEL L. LEMEL, OF SHAKER HEIGHTS, OHIO

DEVICE FOR THE PROTECTION OF THE EYES

Application filed March 26, 1931, Serial No. 525,380, and in Austria November 28, 1930.

This invention relates to devices for the protection of the eyes, and more especially to a device for the protection of the eyes of a surgeon when operating, or the eyes of chemists, industrial workers, drivers of vehicles, and others subject to infection or injury to their eyes during the course of their work.

Another object of the invention is to provide a device of the above character, which forms a part of or is supported by the frames of ordinary spectacles and is adapted to provide means for quickly giving a clear vision in the event the vision becomes obscured due to spattered blood, the accumulation of dust or other substances.

A further object of the invention is to provide a device of the above character, which will shield the eyes yet permit clear vision, and in case of obstruction thereof as mentioned, may be conveniently manipulated to clear the vision.

A further object of the invention is to provide a device of the above character, which is of simple and practical construction, convenient to wear and easily manipulated for giving a clear vision.

For a clear understanding of the invention, reference will be had to the accompanying drawing illustrating the same, and the novel features thereof will be distinctly pointed out in the appended claims.

In the drawing, similar characters of reference are used to indicate corresponding parts.

Figure 1 is a side elevation of a device for the protection of the eyes constructed in accordance with my invention, Fig. 2 is a front view of Fig. 1, Fig. 3 is a rear view of the shield and the pads fixed thereto, and Fig. 4 is a sectional elevation illustrating the pivotal supports for the discs and the shield carried thereby.

Referring to the drawing, 1 represents the eye-glass frames of ordinary spectacles which are adapted to be supported upon the nose by the nosepiece 2 and by the bows 3 in the usual manner. Fixed to and extending forwardly from the eye-glass frames 1 at the outer sides and near the bottoms thereof are pins 4 and 5, each of which is reduced in diameter at 6 thereby providing a shoulder 7, and said reduced end is threaded at 8 for receiving a thumb-nut as indicated by 9 and 10. Upon each of the pins 4 and 5 is a washer, indicated by 11, and rotatably mounted upon said pins adjacent said washers are discs 12 and 13, which are constructed of glass or other suitable transparent material.

Supported upon the pins 4 and 5 is a shield or cover 14 of sheet metal, hard rubber, celluloid, or any other suitable opaque material. Said shield is formed of two circular end portions 15 and 16, which are connected at their upper parts by a central bridge-portion 17 thereby leaving an arched opening 18 for the nose. Sight openings 20 and 21 are provided in the shield 14 opposite the eye glasses or lenses of the spectacles, said openings are eccentric of the pivotal pins 4 and 5 of the discs 12 and 13 and are covered at all times by said discs.

The circular portions 15 and 16 of said shield are slightly smaller in diameter than the discs 12 and 13, in order that the peripheral edges 19 of said discs may extend beyond same and be revolved by pressing a finger against said edges. Said edges may be roughened for securing convenient manipulation.

The shield 14 may be held against the shoulders 7 of the pivotal pins 4 and 5 by the thumb-nuts 9 and 10, which not only serve to retain the parts upon said pins but also for adjusting the clamping pressure holding the discs 12 and 13 against too free rotation. It is preferable, however, to provide means whereby the discs 12 and 13, when revolved, will be automatically cleaned. This is accomplished by fixing to the inner sides 22 of the circular portions 15 and 16 of the shield 14, in any suitable manner, pads 23 and 24 of suitable absorbent material. Said pads do not cover the sight openings 20 and 21, and when the area of the discs 12 and 13 opposite said sight openings become spattered with blood or other substances, or become dusty or in anyway clear vision is obstructed, the revolving of said discs to bring a clean area thereof opposite said sight openings, will automatically clean same. A clean area of said revolvable discs may thus be brought opposite said sight openings and clear vision simply, easily and quickly obtained. If desired the pads 23 and 24 may be provided with suitable chemical solutions for antiseptically cleaning the discs 12 and 13 as they are revolved. Also a nose and mouth mask of cloth or other suitable material may be supported or suspended from the shield 14 in any suitable manner as will be understood.

From the drawing and description, it is readily seen that this device will protect the eyes of a wearer, and at the same time enable him to easily and quickly obtain a clear vision by revolving either of the discs 12 and 13, in either direction, sufficient to bring a clear sector thereof opposite the sight openings 20 and 21 of the shield 14 when said sectors have become soiled and clear vision has thereby become obstructed. Also that said soiled sectors of said discs will become automatically cleaned by the revolving movement of said discs.

Although the construction shown and described is well adapted for carrying out my invention and obtaining the results desired, it is to be understood that slight changes in the details of construction may be made within the scope of the claims.

Having fully described my invention, what I claim is:

1. In a device for the protection of the eyes, the combination of spectacle frames, pins extending from the eye-glass frames thereof, said pins being arranged at the outer sides and near the bottom of said eye-glass frames, discs of transparent material rotatably mounted upon said pins, the discs covering the eye-glass frames, a shield supported by said pins, the shield protecting said discs, the shield being provided with openings opposite the eye-glass frames, and means for retaining said discs and said shield upon said pins.

2. In a device for the protection of the eyes, the combination of spectacle frames, pins extending from the eye-glass frames thereof, said pins being arranged at the outer sides and near the bottom of said eye-glass frames, discs of transparent material rotatably mounted upon said pins, the discs covering the eye-glass frames, a shield supported by said pins, the shield protecting said discs, the shield being provided with openings opposite the eye-glass frames, said pins being threaded, and thumb-nuts on said pins adapted to retain said discs and said shield upon said pins and adjust pressure against said discs for preventing too free rotatable movement thereof.

3. In a device for the protection of the eyes, the combination of spectacle frames, pins extending from the eye-glass frames thereof, said pins being arranged at the outer sides and near the bottom of said eye-glass frames, discs of transparent material rotatably mounted upon said pins, the discs covering the eye-glass frames, a shield supported by said pins, the shield consisting of two circular portions joined by a nose bridge piece, said circular portions of the shield protecting said discs, the shield being provided with openings opposite said eye-glass frames and pads carried by said shield adapted to clean said discs as they are revolved.

In testimony whereof I affix my signature.

SAMUEL L. LEMEL.